Dec. 29, 1964  I. M. DAVIDSON  3,163,376
CONVERTIBLE TYPE AIRCRAFT

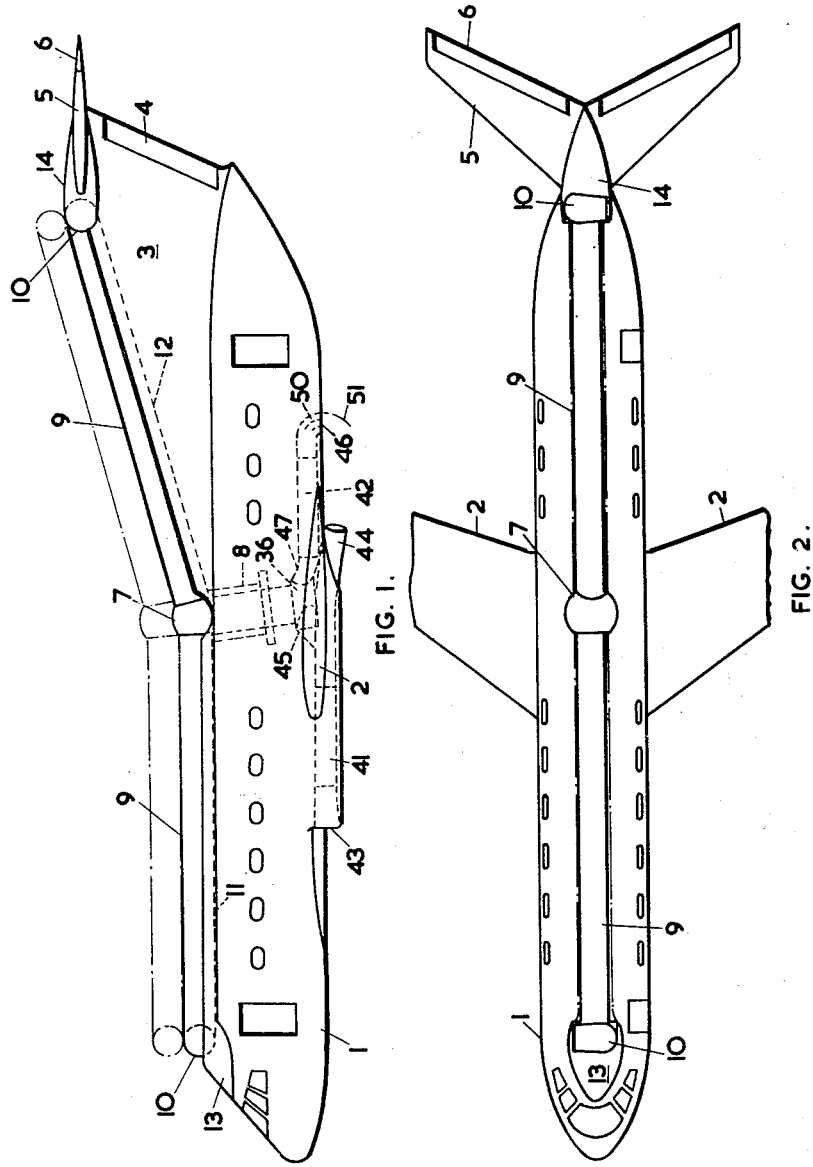

Filed April 2, 1962  3 Sheets-Sheet 2

Ivor Macaulay Davidson
*Inventor*

By
Stevens, Davis, Miller & Mosher
*Attorneys*

Dec. 29, 1964     I. M. DAVIDSON     3,163,376
CONVERTIBLE TYPE AIRCRAFT
Filed April 2, 1962     3 Sheets-Sheet 3

Ivor Macaulay Davidson
*Inventor*

By Stevens, Davis, Miller & Mosher
*Attorneys*

United States Patent Office 3,163,376
Patented Dec. 29, 1964

3,163,376
CONVERTIBLE TYPE AIRCRAFT
Ivor Macaulay Davidson, Farnborough, England, assignor to Power Jets (Research and Development) Limited, London, England, a British company
Filed Apr. 2, 1962, Ser. No. 184,306
Claims priority, application Great Britain Apr. 12, 1961
2 Claims. (Cl. 244—7)

The present invention is concerned with aircraft of the "convertiplane" type, that is, aircraft capable of forward flight in conventional manner supported by aerodynamic lift on the wings and also capable of helicopter operation. In one aspect, the invention provides an alternative to the aircraft arrangements described in copending prior application Serial No. 77,091, filed December 20, 1960, now Patent No. 3,096,041.

This application discloses aircraft of the "convertiplane" type referred to in which the helicopter rotor blades are of circular or substantially circular cross-section, lift thereof being induced by air streams discharged as thin layers over their outer surfaces. In both of the aircraft described and illustrated, the helicopter rotor has two blades which are hinged to the rotor head so that they can be lowered from their operative position in which they are set at a pre-determined coning angle to a generally horizontal plane. In one arrangement the whole rotor is then bodily retractable into a bay within the fuselage, while in the other the blades when lowered lie in longitudinal recesses in the fuselage upper surface. Such hinging of the blades is required to economise in stowage space but it necessarily entails considerable mechanical complication, especially in respect of the transfer ducting required between the rotor head and blades for leading air to the discharge apertures in the blade surfaces.

Hinging of the blades is difficult to avoid in the case of the arrangements described in the prior application where the rotor coning angle is relatively large, about 15°. However it is now believed that the coning angle can be reduced to, say about 8°, in which case a completely rigid rotor becomes possible.

According to the present invention therefore an aircraft has a two-bladed helicopter rotor rotatably mounted on top of its fuselage and wings capable of supporting the aircraft by aerodynamic lift thereon in forward flight, wherein the rotor blades are rigidly attached to the rotor head at a fixed coning angle and the rotor is mounted for bodily movement along its axis between an operative position in which it can rotate with its blades clear of the aircraft structure and an inoperative position in which the blades extend in a fore-and-aft direction and are at least partly housed within the aircraft structure.

According to a feature of the invention, the aircraft structure is formed with longitudinal recesses extending forwardly and rearwardly from the rotor head, the arrangement of the rotor being such that in its inoperative position the blades lie one in each of the recesses.

According to a further feature of the invention the rotor axis is inclined forwardly and in the inoperative position of the rotor one blade lies in a longitudinal recess in the fuselage upper surface extending forwardly from the rotor head while the other blade lies in a longitudinal recess in the upwardly inclined edge of a fin extending rearwardly from the rotor head.

By dispensing with the hinged attachment of the rotor blades to the rotor head, the mechanical construction is considerably simplified. In particular the somewhat complicated ducts for transferring air from the rotor head to the blades while allowing for hinging of the latter can be dispensed with. The saving in this respect should more than offset any disadvantages arising from the provision of a large fin housing the rearward blade.

The aircraft of the prior application are powered by gas turbine jet propulsion engines arranged to discharge their jet streams rearwardly for forward propulsion of the aircraft, provision being made for diverting the jet streams to the tip jet units to drive the rotor. It is also suggested that while all the engines would be required in the helicopter operation phase on take off and landing, some of the engines could be shut down in the forward flight phase.

According to the present invention in another aspect the aircraft is powered by a plurality of engines, one or more of which is used exclusively to drive the helicopter rotor. Thus the aircraft has at least two jet engines, one being connected to discharge its jet stream through a rearwardly directed jet pipe and jet nozzle so as to produce forward thrust on the aircraft and the other being connected to supply its jet stream solely to tip jet units mounted on the rotor blade extremities. In addition, a jet deflector may be provided for diverting the jet stream of the first-mentioned engine from the jet pipe to the tip jet units.

In the aircraft of the prior application, the engines are mounted in pods under the wings while the alternative possibility of mounting them at the aircraft tail is referred to. These arrangements however entail difficulties in respect of the ducting for leading the gas stream from the engines to the rotor head. The present invention in yet another aspect provides an arrangement of the engines in the fuselage.

Thus according to the invention, the aircraft is powered by four jet engines mounted in pairs within the fuselage, two forward and two aft of the rotor head, the engines being arranged with their axes extending generally fore-and-aft and so that the flow through the forward engines is in the opposite direction to the flow through the rearward engines, the forward engines having forwardly facing intakes, rearwardly directed jet pipes for the discharge of propulsive jet streams and jet deflectors for diverting the jet streams from the jet pipes to the rotor head and thence to the tip jet units, and the rearward engines being connected to supply their exhaust gases only to the rotor head and the tip jet units.

An embodiment of the invention will now be described by way of example with reference to the accompanying diagrammatic drawings of which:

FIGURE 1 is a side view of an aircraft of the "convertiplane" type.

FIGURES 2 and 3 are views of the aircraft from above and below respectively.

Figure 3:
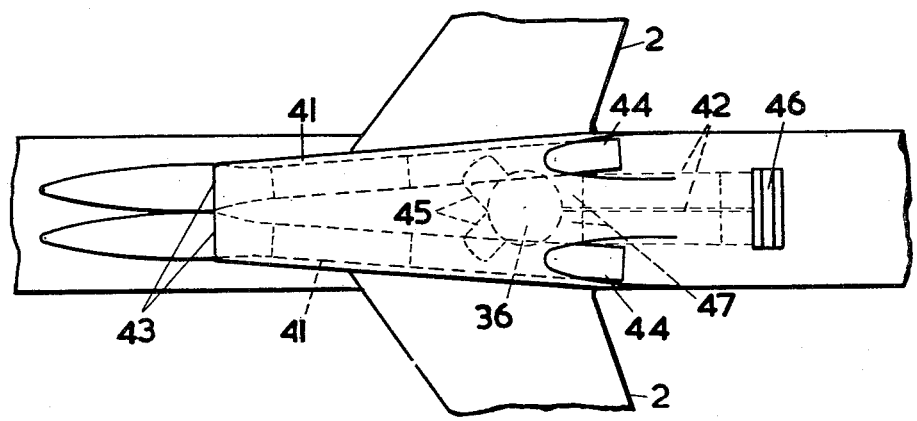
Figure 4:
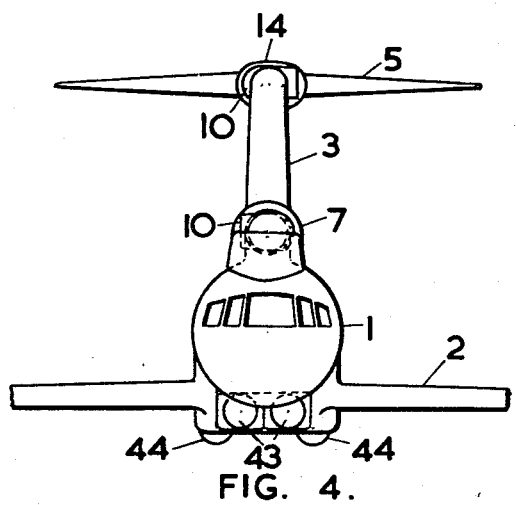
FIGURE 4 is a frontal view of the aircraft.

The stationary structure of the aircraft comprises a fuselage 1, swept back wings 2, a fin 3 with rudder 4 mounted on top of the fuselage and tailplane 5 carrying elevators 6 mounted on top of and at the rearward extremity of the fin. On top of the fuselage is mounted a two-bladed helicopter rotor comprising a rotor head 7 mounted on a pillar 8 and rotor blades 9 rigidly attached to the rotor head. The axis of the rotor is inclined forwardly and the rotor blades are set at a permanent coning angle of about, say, 8°. Tip jet propulsion units 10 are mounted on the extremities of the blades. The rotor is bodily movable along the rotor axis between the inoperative position shown in full lines in which it is partly housed within the aircraft structure and the operative position shown in broken lines in FIGURE 1. In the inoperative position the blades extend in a fore-and-aft direction, the forward blade lying in a longitudinal recess 11 in the fuselage upper surface extending forwardly from the rotor head 7, and the rearward blade lying in a longitudinal recess 12 in the upwardly inclined edge of the fin 3. To accommodate the blade, the fin is thicker than conventional aircraft fins, and also much longer, extending rearwardly from the rotor head to the tailplane. The tip jets units 10 lie in recesses in fairings 13, 14 at the forward end of the fuselage and on the tailplane respectively. In its operative position the rotor is raised to such an extent that it can rotate clear of the aircraft structure.

Figure 5:
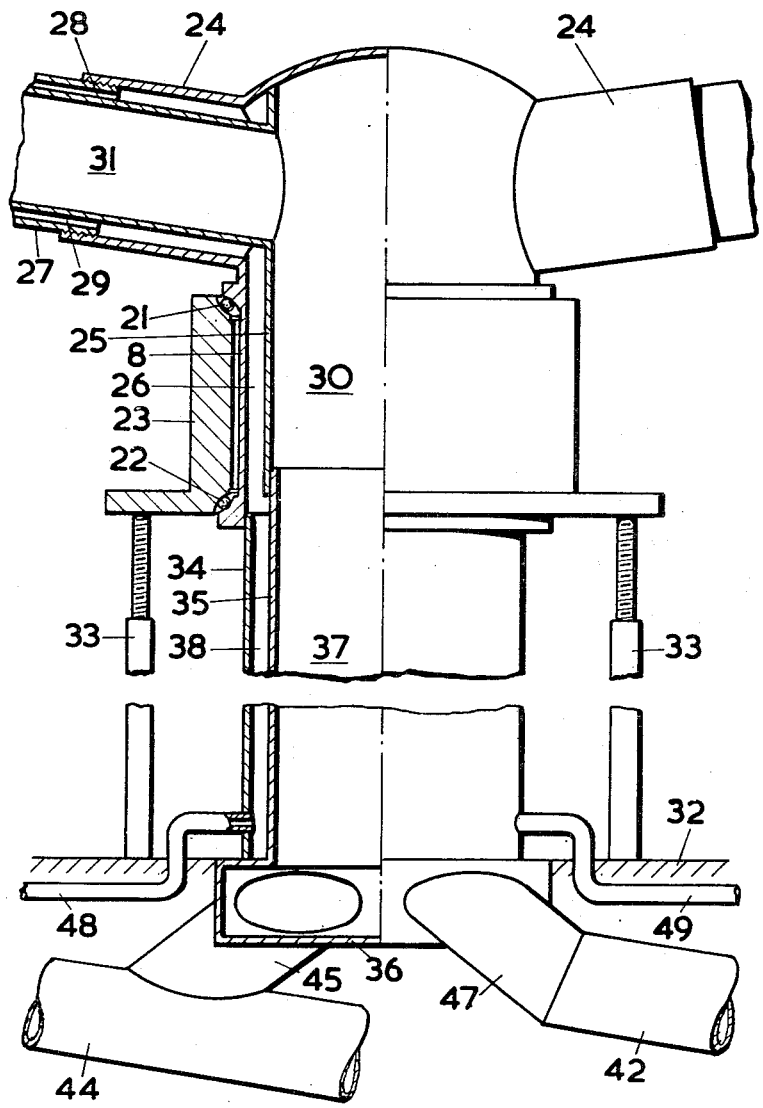
FIGURE 5 is an axial half-sectional view of the helicopter rotor head and pillar.

The construction of the rotor head and pillar and the associated structure is shown in greater detail in FIGURE 5. The rotor pillar 8 is rotatably supported by upper and lower bearings 21, 22 in a supporting sleeve 23. Opposite integral branches 24 from the pillar constitute the roots of the blades. Mounted coaxially within the pillar is a liner 25 defining therewith an annular passage 26. Each rotor blade comprises an outer shell 27 rigidly connected to the blade root 24 and an inner liner 28 connected at its inner end to the liner 25 and defining with the shell an annular passage 29 which is in communication with the passage 26. The space 30 within the pillar liner 25 is in communication with the spaces 31 within the blade liners, and these latter spaces constitute passages leading to the tip jet units 10.

The sleeve 23 is itself supported from the stationary structure of the aircraft (indicated at 32) by a ring of extendible members 33 such as screw jacks. The pillar 8 and its liner 25 are in sliding telescopic engagement with a pillar extension made up of two coaxial tubular members 34, 35 upstanding from a plenum chamber 36 secured to the stationary structure. The inner tubular member 35 defines a passage 37 whereby the space 30 is in communication with the plenum chamber, while the tubular members define between them an annular passage 38 in communication with the annular passage 26. By means of the jacks 33 the rotor can be moved between its operative and inoperative positions previously referred to.

The aircraft is powered by four gas turbine jet propulsion engines 41, 42, which are preferably of the by-pass type, and are mounted side-by-side in pairs within the lower part of the fuselage, two forward and two aft of the rotor pillar 8 with their axes extending generally fore-and-aft. The forward engines 41 are arranged for flow therethrough in a rearward direction and are connected to draw in air through forwardly facing scoop intakes 43 in the fuselage undersurface and to discharge their jet streams through rearwardly directed jet pipes and nozzles 44. The jet pipes are formed with branches 45 connected to the plenum chamber 36, and jet deflectors, which may be as described in the prior applications, are provided at the junction of the jet pipes 44 and their branches 45 whereby the engine jet streams may be diverted to the hollow interior of the rotor pillar, head and blades to supply the tip jet units. The rearward engines 42 are arranged for flow therethrough in a forward direction and are connected to draw in air through an intake 46 in the fuselage undersurface and to discharge through ducts 47 directly into the plenum chamber so that they supply the tip jet units 10 exclusively.

As in the prior application the rotor blades 9 are of circular or near-circular cross-section and their outer shells 27 are formed with spanwise-extending discharge apertures whereby air may be discharged over the blade outer surfaces as thin layers in such a direction as to induce lift on the blades by boundary layer or circulation control. A particular arrangement of the apertures is disclosed in copending prior application Serial No. 184,305, filed December 2, 1962, now Patent No. 3,109,494. Thus each blade may be formed with rearwardly facing apertures in the region of the top and bottom of the blade, arranged to discharge air streams respectively downwardly and upwardly over the rearward part of the surface of the blade, and with one or more further apertures spaced rearwardly around the upper part of the blade from the top aperture and facing at least partly downwardly. The bottom aperture and the downwardly discharging aperture nearest thereto may be of variable discharge area. The air for the discharge apertures is taken from the by-pass compressors of the engines through pipes 48, 49 which lead into the annular passage 38.

For take off, the rotor is extended to its operative position by extension of the jacks 33 and the jet deflectors in jet pipes 44 are set to divert the jet streams into the plenum chamber 36. All four engines are set in operation to supply exhaust gases to the tip jet units whereby the rotor is driven and also to supply compressed air to the apertures in the blade surfaces to induce lift on the blades. The aircraft can then take off vertically as a helicopter and when sufficient height has been gained, it is tilted to give it some forward motion. As forward speed is gained the lift is taken over by the wings, while the jet deflectors are reversed so that the jet streams from engines 41 are discharged rearwardly to produce forward thrust. Eventually the rearward engines 42 can be shut down altogether so that the drive to the rotor is discontinued, the air supply to the aperture in the blade surfaces also being shut off. The rotor is then allowed to slow down and is brought to a halt with its blades extending in a fore-and-aft direction, after which it can be retracted to its inoperative position referred to above.

Provision is made for varying the flow of air through the boundary layer control apertures by controls equivalent to the conventional cyclic and collective pitch controls of a helicopter acting on a mechanism which may be similar to that disclosed in copending application No. 184,305. Thus the discharge areas of the apertures are variable by means of a flexible strip operable hydraulically by an inflatable bladder, the bladders for the two variable area apertures in each blade being connected to opposite sides of a piston operating in a cylinder mounted at the root end of the blade. A swash plate is mounted on the supporting sleeve 23 and provision is made for tilting it and for raising and lowering it bodily. The pistons are connected to followers engaging with the swash plate at diametrically opposite positions. In this way the relative momentum of the streams from the upwardly and downwardly discharging apertures in opposite blades is varied cyclically in anti-phase relationship in accordance with the rotation of the rotor, and there is a corresponding cyclic variation of blade lift. The phase relationship between blade life and rotor rotation can be varied by tilting the swash plate to effect rolling and pitching control, while by raising or lowering the swash plate bodily, the momentum of the streams discharged from corresponding apertures in opposite blades and hence the blade lift can be varied in unison.

Alternatively the swash plate can be connected to adjust valves controlling the air supply to the apertures to vary the momentum of the streams and the blade lift in the manner referred to.

It will be noted that no flapping hinges are provided for the blades, the coning angle of rotor and the design of the blades being such that the centrifugal loads counteract the bending moments of the blades.

The intake 46 for the rearward engines 42 is provided with cascade of flow-directing vanes 50 and with a retractable scoop 51 to guide the flow into the intake in the transition phase between vertical and normal horizontal flight.

Since the rearward engines 42 are used only for supplying the tip jet units, they may be of a different type to the forward engines 41 which have the dual function of affording forward propulsion in normal flight and supplying the tip jet units in the helicopter operation phase.

While the invention has been described in relation to an aircraft with circular section helicopter rotor blades as in the prior applications, certain features may find application in other aircraft of the "convertiplane," for example, with helicopter rotor blades of conventional aerofoil form.

I claim:

1. An aircraft comprising a fuselage, a fin mounted on top of the fuselage, wings capable of supporting the aircraft by aerodynamic lift thereon in forward flight, a two-bladed helicopter rotor including a rotor head and a pair of opposite rotor blades rigidly attached thereto at a fixed coning angle, means rotatably mounting the rotor head on top of the fuselage for rotation of the rotor about a forwardly inclined axis, the fuselage being formed with a longitudinal recess extending forwardly from the rotor head and the fin having an upwardly inclined edge extending, rearwardly from the rotor head and formed with a longitudinal recess, and means for moving the rotor bodily along its axis between an operative position in which it can rotate clear of the fuselage and fin and an inoperative position in which the blades lie one in each of said recesses.

2. An aircraft comprising stationary structure including a fuselage and wings capable of supporting the aircraft by aerodynamic lift thereon in forward flight, a two-bladed helicopter rotor including a rotor head and a pair of opposite rotor blades rigidly attached thereto at a fixed coning angle, means rotatably mounting the rotor head on top of the fuselage for rotation of the rotor about its axis, and means for moving the rotor bodily along its axis between an operative position in which it can rotate with its blades clear of the said structure and an inoperative position in which the blades extend fore-and-aft and are at least partly housed within said structure and further comprising a tailplane mounted on top of and at the rearward extremity of the fin, fairings at the forward end of the fuselage and on the tailplane, and tip jet units mounted on the rotor blade extremities, said fairings being formed with recesses arranged to receive the tip jet units when the rotor is in its inoperative position.

References Cited in the file of this patent
UNITED STATES PATENTS

| | | |
|---|---|---|
| 2,953,319 | Gluhareff | Sept. 20, 1960 |
| 3,096,041 | Cheeseman et al. | July 2, 1963 |